United States Patent [19]

Teshima et al.

[11] 4,389,095
[45] Jun. 21, 1983

[54] MULTI-COLORED LIQUID CRYSTAL DISPLAY DEVICE WITH CHARACTERS NOT DISPLAYING SHIFTS IN POSITIONS EVEN UPON COLOR CHANGES

[75] Inventors: Toru Teshima, Yokohama; Kazuo Ariga, Tokyo; Takao Kasahara, Sagamihara, all of Japan

[73] Assignee: Stanley Electric Co., Ltd., Tokyo, Japan

[21] Appl. No.: 195,868

[22] Filed: Oct. 10, 1980

Related U.S. Application Data

[63] Continuation-in-part of Ser. No. 134,121, Mar. 26, 1980, abandoned.

[30] Foreign Application Priority Data

Apr. 6, 1979 [JP] Japan .................................. 54-41573

[51] Int. Cl.$^3$ .............................................. G02F 1/13
[52] U.S. Cl. ...................................... 350/334; 350/336
[58] Field of Search ............... 350/332, 333, 334, 336, 350/349, 342, 343

[56] References Cited

U.S. PATENT DOCUMENTS

| 3,569,614 | 3/1971 | Hanlon . | |
| 3,687,515 | 8/1972 | Haas et al. . | |
| 3,781,465 | 12/1973 | Ernstoff et al. | 350/349 |
| 3,807,127 | 4/1974 | Stern | 350/343 |
| 3,820,875 | 6/1974 | Bohmer | 350/336 |
| 3,834,791 | 9/1974 | Raimbault | 350/343 |
| 3,861,783 | 1/1975 | Dill et al. | 350/334 |
| 4,056,306 | 11/1977 | Misono et al. | 350/343 |
| 4,097,130 | 1/1978 | Cole . | |
| 4,235,526 | 11/1980 | Berman et al. | 350/349 |

FOREIGN PATENT DOCUMENTS 52-128161 10/1977 Japan .
54-48196 4/1979 Japan .
54-48197 4/1979 Japan .

OTHER PUBLICATIONS

Nassimbene, E. G. "Liquid Crystaline Flaring Character Format", *IBM Technical Disclosure Bulletin*, vol. 15, No. 5, Oct. 1972, p. 1544.

*Primary Examiner*—John K. Corbin
*Assistant Examiner*—David Lewis
*Attorney, Agent, or Firm*—Frishauf, Holtz, Goodman & Woodward

[57] ABSTRACT

A liquid crystal device is disclosed wherein each part of a display section exhibiting a display pattern is divided into a plurality of segments by a spacer; liquid crystals of different absorption spectra are sealed in these segments; a transparent selective electrode is disposed in each segment; and the selective electrodes are selectively made to conduct, thereby enabling a display of different colors.

5 Claims, 12 Drawing Figures

MULTI-COLORED LIQUID CRYSTAL DISPLAY DEVICE WITH CHARACTERS NOT DISPLAYING SHIFTS IN POSITIONS EVEN UPON COLOR CHANGES

CROSS-REFERENCE TO RELATED APPLICATION

This is a continuation-in-part of U.S. application Ser. No. 134,121 filed Mar. 26, 1980, now abandoned.

BACKGROUND OF THE INVENTION

The present invention relates to a liquid crystal display device capable of color displays wherein each part of a display section comprises a collection of segments of substantially the same shape, in each of which is sealed liquid crystals having an absorption spectrum different from the adjacent segment, so that the displays can be selectively displayed in different colors.

A conventional liquid crystal display device, in general, is constructed so that liquid crystal is sealed in the space between a pair of display plates having a pair of transparent electrodes. In one display plate is formed a transparent common electrode, in the other display plate is formed one or more selective electrodes corresponding to a desired display pattern, and an electric field is applied between the common electrode and the selective electrodes.

In a liquid crystal device of this prior construction, it is possible to display a plurality of different display patterns on a display surface. However, it is impossible to selectively exhibit a multi-color display with a single display pattern without substantially changing the position of the display pattern. Therefore, the liquid crystal display device which is generally used is so constructed that a multi-color display with different display patterns is possible, but a multi-color display in a same display pattern is impossible. Thus, the display tends to be monotonous.

SUMMARY OF THE INVENTION

Therefore, one object of the present invention is to provide a liquid crystal display device for displaying a single display pattern with a plurality of colors without substantially changing the position of the display pattern.

Another object of the present invention is to provide a liquid crystal display device capable of dot displaying, for displays in desired positions and in desired colors in a dotted pattern or in a line pattern.

To the above and other ends, the present invention provides a liquid crystal display device wherein each part of a display section providing a desired display pattern comprises a collective body of a plurality of segments; liquid crystals of different absorption spectra are sealed in adjacent segments, and each segment is displayed selectively, so that a display of different colors in a single display pattern can be obtained without substantially changing the position of the pattern. In this device, the segments are separated by a spacer, selective electrodes are disposed in a manner corresponding to the display pattern formed by these segments, and the selected electrodes conduct for selecting the display colors so that the single display pattern can be displayed in different colors. Further, in this device, selective electrodes may be arranged in a matrix form, and points of intersection are selectively turned on for enabling a dotted display. Thus, a multi-color display with a single display pattern is possible without changing the position of the pattern.

DETAILED DESCRIPTION

Figure 1:
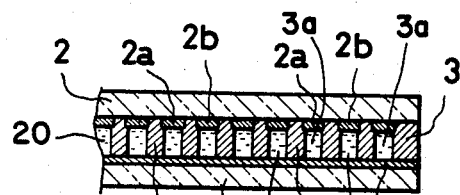
FIG. 1 is a sectional view illustrating a first embodiment of a liquid crystal display device according to the present invention, the sectional view being of part of a display section wherein the display pattern is bar-shaped.
Figure 2:
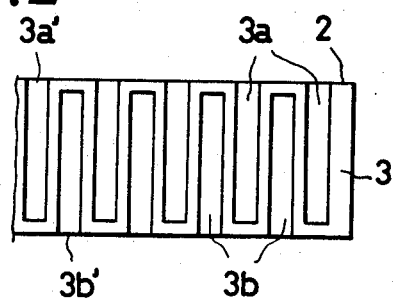
FIG. 2 is a plan view of the display pattern of the display section shown in FIG. 1.

Referring to the drawings, a first embodiment of the present invention is shown in FIGS. 1 and 2 wherein bar graphs are displayed, and a plurality of segments collectively show a pattern of one bar graph. The embodiment of FIGS. 1 and 2 comprises transparent glass plates 1 and 2, and a common electrode 1a formed over substantially the entire surface of the transparent glass plates 1,2. Bar-shaped selective electrodes 2a,2b are formed over one face of the transparent glass plate 2 and are separated from each other by a spacer 3.

Figure 4:
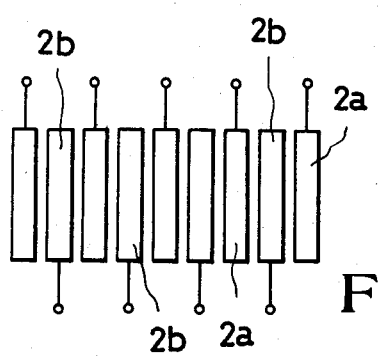
FIG. 4 is a pattern diagram showing selective electrodes which may be used in both the first and second embodiments of the present invention.

The spacer 3, as shown by the top view of FIG. 2, has segments 3a and 3b constituting a plurality of chambers divided in a zig-zag manner. Each of these segments has an opening 3a' and 3b', respectively. The spacer 3 is a member for forming the divided segments 3a,3b in which are sealed liquid crystals 20 of different absorption spectra. This spacer 3 is formed by screen printing a material such as glass of low melting temperature over a surface of the transparent glass plate 2. For integrally forming the transparent glass plates 1 and 2 with the spacer 3 interposed therebetween, the spacer 3 is formed over one surface of the transparent glass plate 2 by the above-mentioned method, the transparent glass plate 1 is superposed thereover, and firing is performed. Before this, a common electrode 1a is formed on the transparent glass plate 1, and bar-shaped selective electrodes 2a and 2b are alternately formed over the transparent glass plate 2 as shown in FIG. 4.

At one end of each of the segments 3a and 3b each divided into a plurality of parts, is formed an opening 3a' or 3b' which is not surrounded by the transparent glass plates 1 and 2. Thus, liquid crystals of different absorption spectra may be sealed in the chambers through these openings.

For example, red liquid crystal may be sealed in through the opening 3a', and green liquid crystal sealed in through the opening 3b'. Red liquid crystal is then sealed in the next chamber and so on, so that liquid crystals of two different colors are alternately sealed in the chambers formed between spacers 3. After sealing the liquid crystal, an epoxy resin is applied or a metalizing processing is performed and, thereafter, the openings 3a',3b' are sealed a final time by indium soldering.

The width of the segments 3a and 3b divided by the spacer 3 preferably exceeds the resolution ability of the human eye, for example, within the range of 0.05 to 0.1 mm. The width of the spacer 3 (between segments 3a,3b) for forming the segments is preferably in the same range or below this range. By choosing the width in this manner, a bar-shaped display of red and green colors can be obtained when bar-shaped selective electrodes 2a and 2b disposed in separated segments are sequentially made to conduct. When only the segments with red liquid crystal are selectively illuminated by their electrodes, a red bar-shaped display can be obtained. Similarly, when the segments with green liquid crystal alone are selectively illuminated, a green bar-shaped display can be obtained. By arranging a plurality of liquid crystals obtained in this manner, one next to another, bar-shaped graphs using liquid crystal can be easily obtained. Since each segment 3a,3b is close to the next (i.e., spacing of from about 0.05 to 0.1 mm), no noticeable position shift will occur, even when the display is switched from the green display to the red display or when the display mixes colors. Thus, recognition of the display is facilitated.

Figure 3:
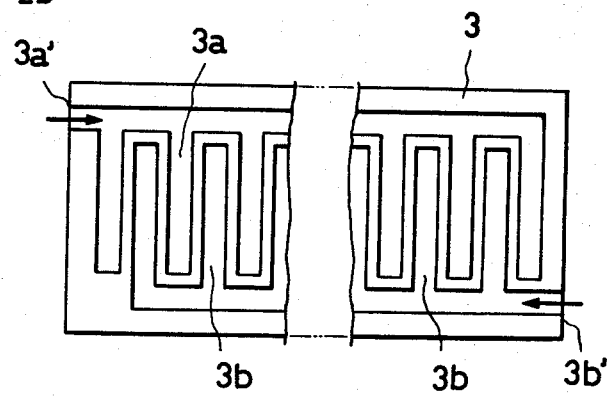
FIG. 3 is a plan view of a second embodiment of the present invention illustrating a display section with a bar-shaped display pattern wherein the shape of the spacer is changed.

FIG. 3 shows a second embodiment of the present invention wherein the shape of the spacer 3 is modified. This embodiment is different from the first embodiment in that only one opening is used for sealing liquid crystal of one absorption spectrum. In this case, the sealing operation of the liquid crystal is easy, and sealing of the openings is easy since only two openings 3a' and 3b' must be sealed. Thus, the manufacturing process can be simplified. For manufacturing the spacer 3, screen printing can be utilized as in the case of the first embodiment. The bar-shaped selective electrodes alternately formed for each segment 3a and 3b are dot-formed in the path of flow of the liquid crystal. Thus, it is possible to obtain a bar-shaped display or to arrange a plurality of these devices one next to another as in the case of the first embodiment.

Figure 5:
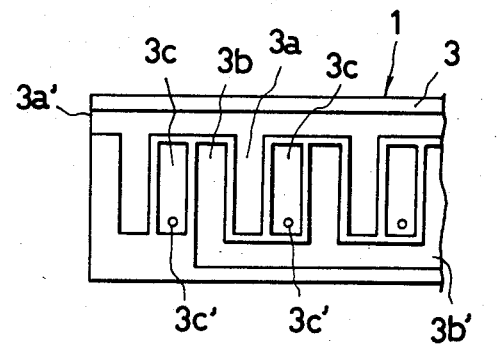
FIG. 5 is a plan view of a third embodiment of the present invention illustrating a display pattern using three display colors.

FIG. 5 shows an example of a spacer 3 which permits liquid crystals of three different colors to be sealed in the device. This example is different from the second embodiment in that a further independent segment 3c is formed in addition to the segments 3a and 3b divided by the spacer 3. In this example, an opening 3c' is formed by a hole in the transparent glass plate 1' to be used as an opening for sealing liquid crystal of a third color in the segment 3c. By sequentially sealing liquid crystals of three different colors in segments 3a,3b or 3c, respectively, a mixed color display or a display of a single color may be obtained.

Figure 6:
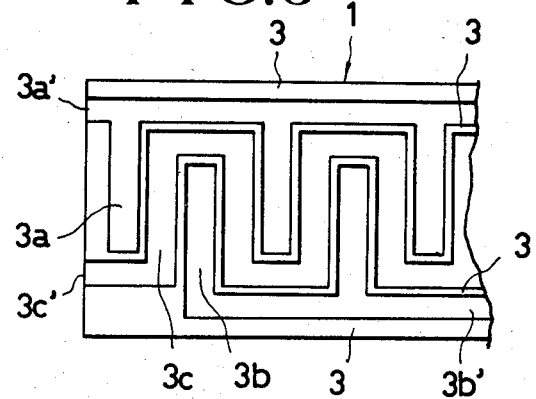
FIG. 6 is a plan view illustrating a display pattern of a different shape with the same colors as shown in the third embodiments of FIG. 5.
Figure 7:
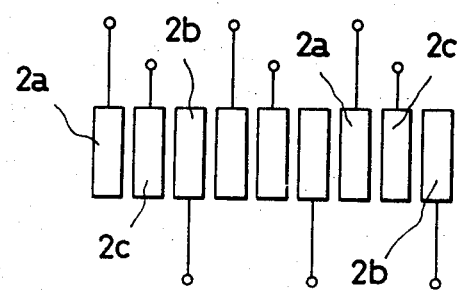
FIG. 7 is a pattern diagram illustrating the selective electrodes of the third embodiment of FIG. 5.

FIG. 6 shows another modification of the device which includes liquid crystals of three different colors. This example is different from the example of FIG. 5 in that the sealing of each liquid crystal can be accomplished without forming an opening in the transparent glass plate 1. That is, the further segment 3c is formed in a zig-zag manner between the segment 3a and the other segment 3b, so that the three segments are adjacent each other. With this construction, since the openings 3a',3b' and 3c' can be formed without forming holes in the transparent glass plate 1, the manufacturing process is facilitated. Selective electrodes for each segment for the three color display can be arranged as shown in FIG. 7. That is, a selective electrode 2c corresponding to a segment 3c is interposed between the selective electrode 2a for the segment 3a and the selective electrode 2b for the segment 3b.

In the examples described above, a plurality of separate segments are formed by linearly dividing a display surface by a spacer and liquid crystals of different absorption spectra are sealed in adjacent segments, so that displays of different colors or of mixed colors can be obtained. By arranging a plurality of such devices, one next to the other, a graph display, such as a bar-shaped graph, is made possible. Further, since each segment in all of the above-mentioned examples is adjacent to the next in their longitudinal directions, no shift in the position of the display will occur in displaying with only one color or with mixed colors.

Figure 8:
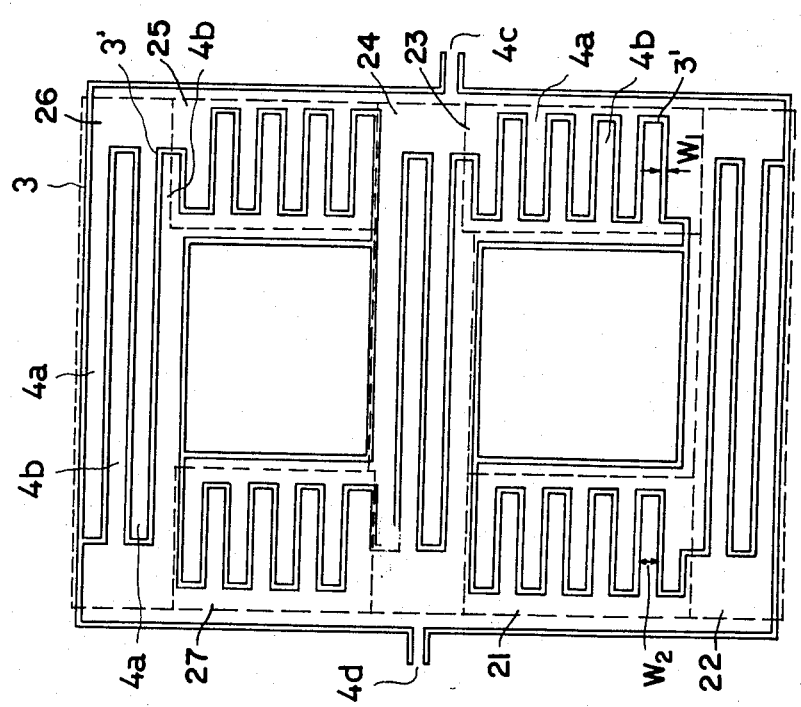
FIG. 8 is a plan view of the display pattern wherein the liquid crystal display device of the present invention is utilized for displaying digits with seven segments.

FIG. 8 shows another embodiment wherein the device is utilized as a digit display device having seven display parts. In this embodiment, the spacer 3 is arranged in a zig-zag manner as shown in FIG. 8. Each part of the digit display is formed by a group of segments, and the space between the segments forming the groups of segments is set to be sufficiently small, for example, within the range of 0.05 to 0.1 mm. That is, the widths $W_1$ of the dividing spacer elements 3', as indicated in FIG. 8, is between about 0.05 and 0.1 mm. The widths of the segments $W_2$, as indicated in FIG. 8, is also between about 0.05 and 0.1 mm.

For forming a digit display of seven parts, the vertical and transverse lines of the display are formed by a plurality of groups of segments, for example, groups 21-27. The FIG. 8 device has seven groups of segments. When the dividing panel 3' of the spacer 3 is formed in a zigzag manner, two each of segments 4a and 4b, for transverse lines of the digits are grouped in a group of four for each of the three transverse lines of the digits in the display. Four each of segments 4a and 4b are grouped in a group of eight for each of the vertical line portions of the digit display. Liquid crystal of one color is sealed in the segments 4a. Liquid crystal of a different color is sealed in the segments 4b. For example, red liquid crystal is sealed in the segments 4a, and green liquid crystal is sealed in the segments 4b, so that colors of adjacent segments are different. 4c and 4d are openings formed in opposite sides of the spacer 3 for enabling inserting of the liquid crystal.

Figure 9:
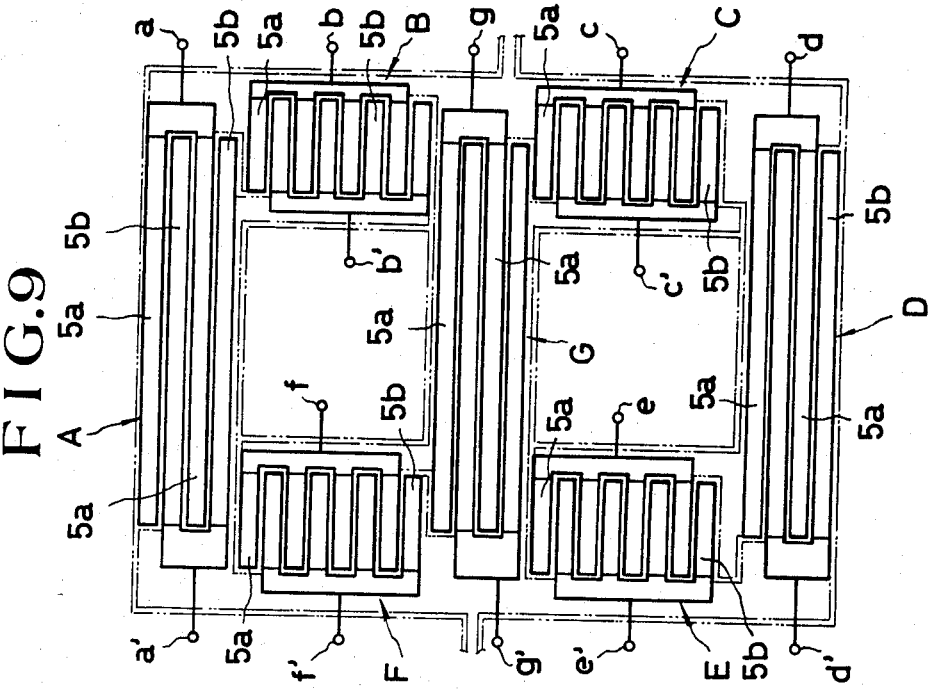
FIG. 9 is a pattern diagram illustrating the selective electrodes of the display pattern shown in FIG. 8.

As shown in FIG. 9, selective electrodes 5a and 5b are formed in their respective segments. That is, in the segment groups A, D and G for displaying transverse lines, two each of the selective electrodes 5a and 5b are alternately disposed. A voltage is selectively applied across the electrodes 5a and 5b respectively at the conductive terminals a, a', d,d', g and g'. The segment groups B, C, E and F for displaying the vertical lines respectively include alternate electrodes 5a and 5b, four each in number. A voltage is selectively applied across the electrodes 5a and 5b respectively at the conductive terminals b, b', c, c', e, e', f and f'. When red liquid crystal is, for example, sealed in the segments 4a, a red display is produced when a voltage is applied to the 5 conductive terminals a to g. When green liquid crystal is sealed in the segments 4b, a green display is produced when a voltage is applied across the conductive terminals a' to g'.

Therefore, for displaying the digit 1, the segments of the group B electrodes and the segments of the group C electrodes are turned on. For displaying the number 1 in red, a voltage is applied to the conductive terminals b and c. A voltage is applied to the conductive terminals b' and c' for displaying the digit 1 in green. In the case of the digit 4, the segments of groups B, C, G and F are turned on. When a voltage is applied to the terminals b, c, g and f, the number is displayed in red. When a voltage is applied to the terminals b', c', g' and g', the number 4 is displayed in green. Therefore, due to the close spacing between segments, and the small widths of the segments, about 0.05 to 0.1 mm in both cases, the apparent position of the display is not substantially changed even when the color of the display is varied. When each part of the display section is formed by a group of segments, corresponding groups of electrodes are disposed in each group of segments, and the colors of the liquid crystals sealed in each adjacent segment are made different so that selective multi-color displays and mixed color displays are made possible.

When the device is used for a calculator display, for example, the device may be used in various ways, such as for changing the display color when the digits overflow the display.

Figure 10:
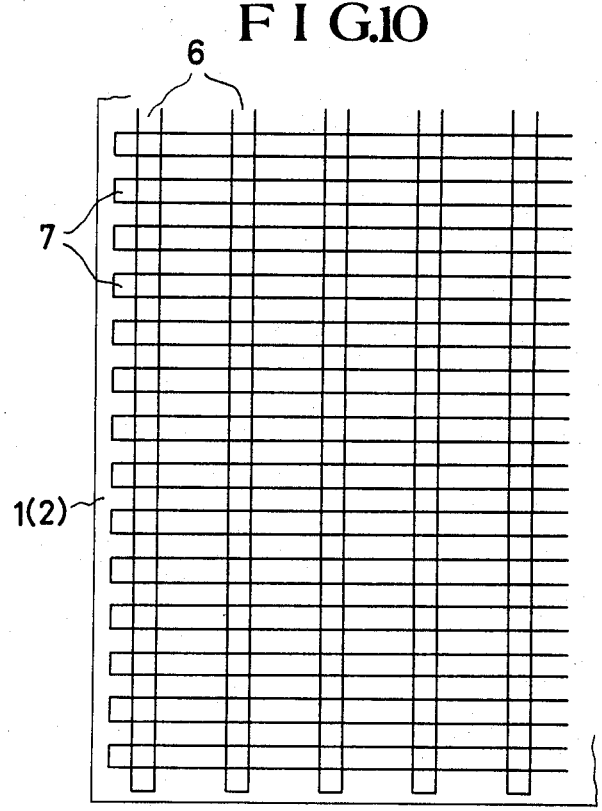
FIG. 10 is a pattern diagram of selective electrodes when the liquid crystal device is utilized for matrix display.
Figure 11:
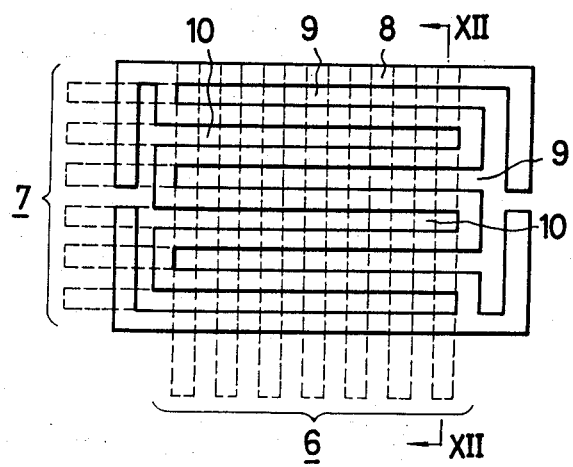
FIG. 11 is a schematic view showing the relation between the segments and the selective electrodes in the case of a matrix display.
Figure 12:
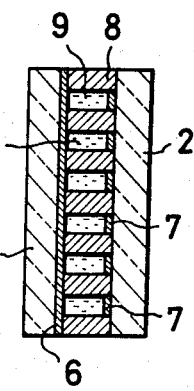
FIG. 12 is a sectional view along the line XII—XII of FIG. 11.

FIG. 10 shows a display device which is capable of dot displaying in a matrix form. As in a usual liquid crystal display device, vertical line-shaped electrodes 6 are formed on the inner surface of one of a pair of transparent glass plates, and transverse line-shaped electrodes 7 are formed on the inner surface of the other transparent glass plate. A spacer 8 is constructed, as shown in detail in FIG. 11, so that line-shaped segment groups 9 and 10 are alternately disposed with respect to each other. By sealing liquid crystals of different colors in the segment groups 9 and 10, two different colors alternatively appear in a vertical direction, and a single color appears in a transverse direction so that a dotted display can be obtained. In disposing the line-spaced electrodes 6 and 7, the vertical line-shaped electrodes 6 are disposed on one of the glass plates 1, and the transverse line-shaped electrodes 7 are disposed on the other glass plate 7, as shown in FIG. 12, for forming a matrix.

By selectively applying a voltage to one of the vertical line-shaped electrodes 6 and one of the transverse line-shaped electrodes 7, the liquid crystals at the points of intersection are illuminated so that a dotted display is obtained.

Therefore, when the width of the line-shaped segments 9 and 10 is sufficiently narrowed (i.e., 0.05 to 0.1 mm as in the aforementioned embodiments) for forming a number of spaced segments, the spacing also being from 0.05 to 0.1 mm, and when the line-shaped electrodes 7 are disposed so as to correspond to each segment and the line-shaped electrodes 6 are similarly arranged, an infinite number of dotted displays can be obtained. By selectively applying a voltage to the line-electrodes 6 and 7, a desired pattern may be obtained. Again, in this case, the apparent position of the display as seen by a viewer, will not change, even when a single pattern is switched to another color or to a display of a mixed color.

As is apparent from the above description, in the device according to the present invention, each part of a display pattern is disposed adjacent to another part, and each part comprises a plurality of segments whose widths and spacings are sufficiently small (i.e., from about 0.05 to 0.1 mm). Liquid crystals of different absorption spectra are then sealed in adjacent segments. Thus, a mixed color display or a display of a single color can be easily obtained. By virtue of this arrangement, the apparent position of the display, as seen by a viewer, will not be changed within the same pattern even when the display color is changed.

Although the present invention has been described with reference to display devices for bar-shaped graphs or for digit display devices of seven parts, in addition to pattern displays in a matrix form, it is to be understood that the present invention is applicable to other display devices, such as warning devices which give a warning by changing the display color, meter displays for various measuring devices, and speedometers for automobiles.

We claim:

1. A multi-colored liquid crystal display device having a viewing surface comprising:
   at least one display section exhibiting a given display pattern, said at least one display section including a plurality of closely adjacent display segments, the spacing between adjacent display segments being from about 0.5 to about 0.1 mm and each display segment having a width of from about 0.05 to about 0.1 mm, each of said display segments exhibiting substantially the same said given display pattern and each said display segment including means for receiving liquid crystals therein;
   said display segments of said at least one display section being adjacent each other in a direction substantially along said viewing surface and being so closely adjacent each other that, to a viewer, they appear to be in substantially the same position on said display device;
   liquid crystals of respective different absorption spectra sealed in adjacent display segments of said at least one display section, each display segment of said at least one display section containing liquid crystals of a different absorption spectrum such that said adjacent display segments provide respective different color displays when energized; and
   a source of electrical power coupled to said display segments for selectively energizing respective display segments of said at least one display section to selectively produce a display of said given display pattern in different colors without substantially changing the apparent position of said given display pattern with respect to a viewer.

2. The multi-colored liquid crystal display device of claim 1, comprising a plurality of said display sections, each of said display sections exhibiting a given display pattern.

3. The multi-colored liquid crystal display device of claim 2, wherein said given display pattern of at least a number of said plurality of display sections are line-shaped display patterns, each display section having said line-shaped display pattern comprising at least two line-shaped display segments, liquid crystals of different absorption spectra being sealed in adjacent display segments of each of said number of display sections, and wherein said selectively energizing means comprises a plurality of line-shaped electrodes arranged in a matrix form and located adjacent said display sections, the respective line-shaped electrodes being selectively energized for selectively energizing respective points of intersection of the matrix of line-shaped electrodes to produce a dotted display of a desired color.

4. The multi-colored liquid crystal display device of any one of claims 1, 2 or 3, wherein segments of two different colors are adapted to be simultaneously turned on in a display section to selectively produce a display of a third color by said two different colors.

5. The multi-colored liquid crystal display device of claim 1, wherein said display segments are elongated segments.

* * * * *